Jan. 8, 1952  S. ZUGARO ET AL  2,581,569
TIRE REMOVING AND REPLACING MACHINE
WITH A ROTATABLE WHEEL SUPPORT
Filed Aug. 13, 1948  6 Sheets-Sheet 5
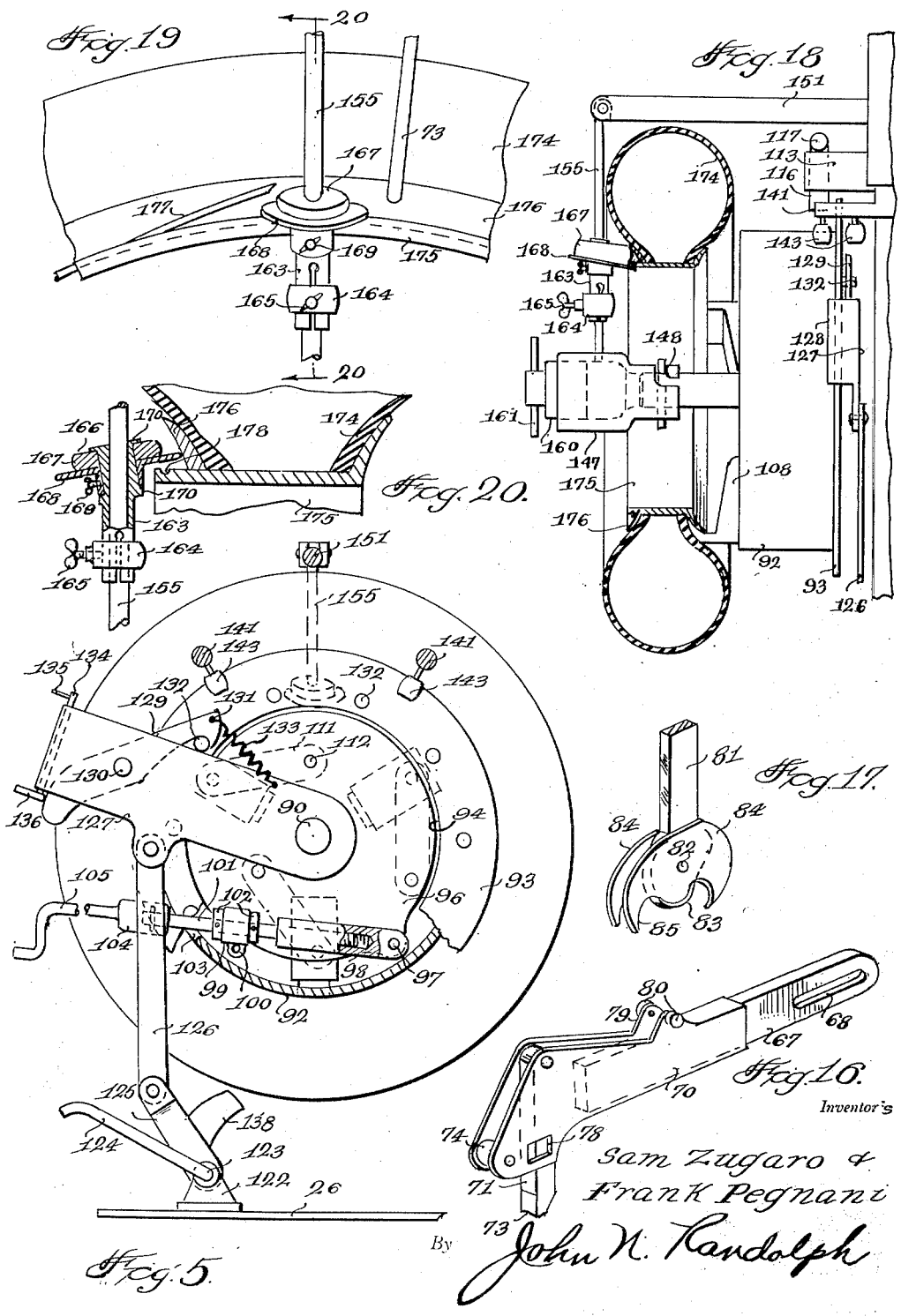
Inventors
Sam Zugaro &
Frank Pegnani
By John N. Randolph
Attorney

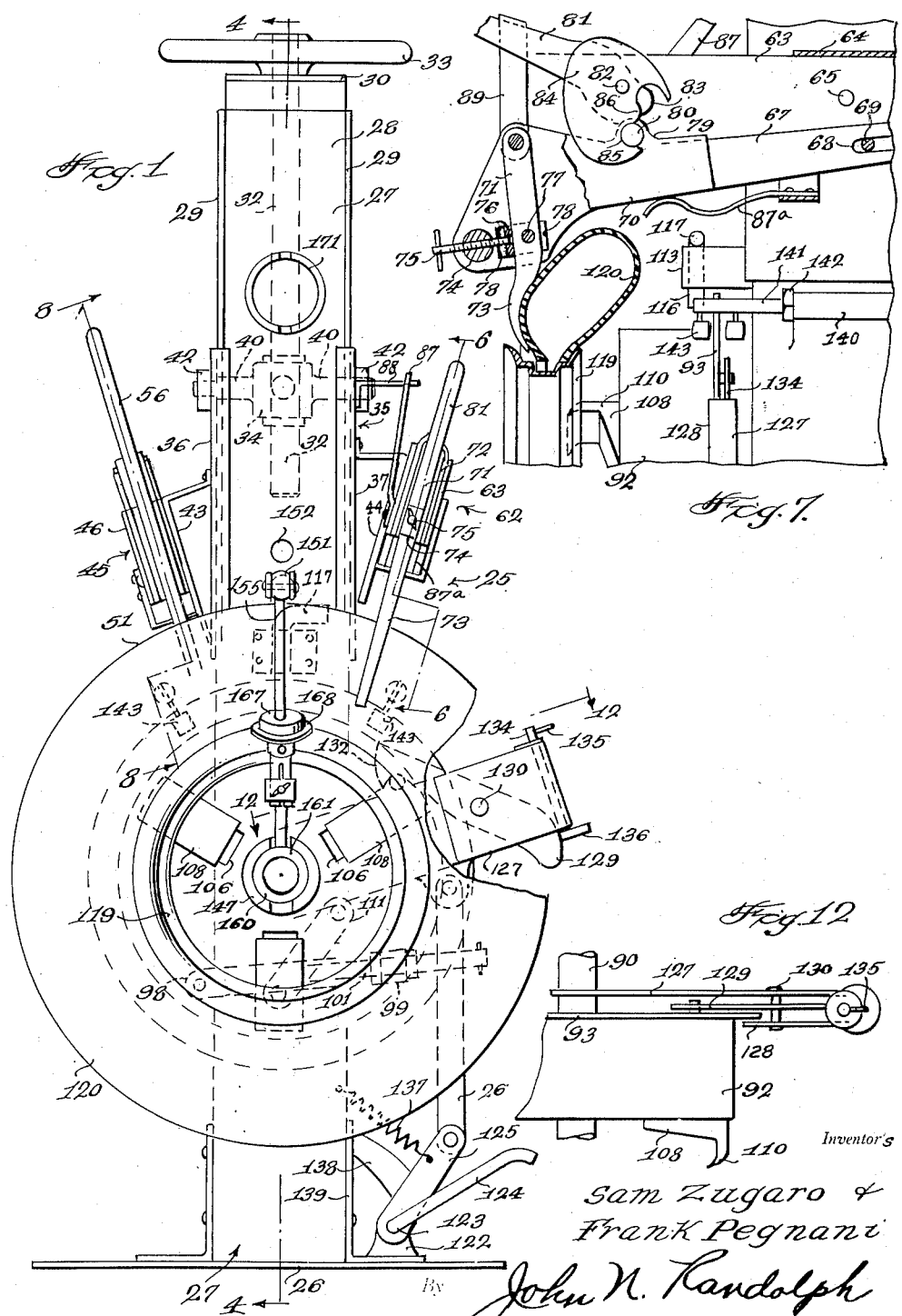

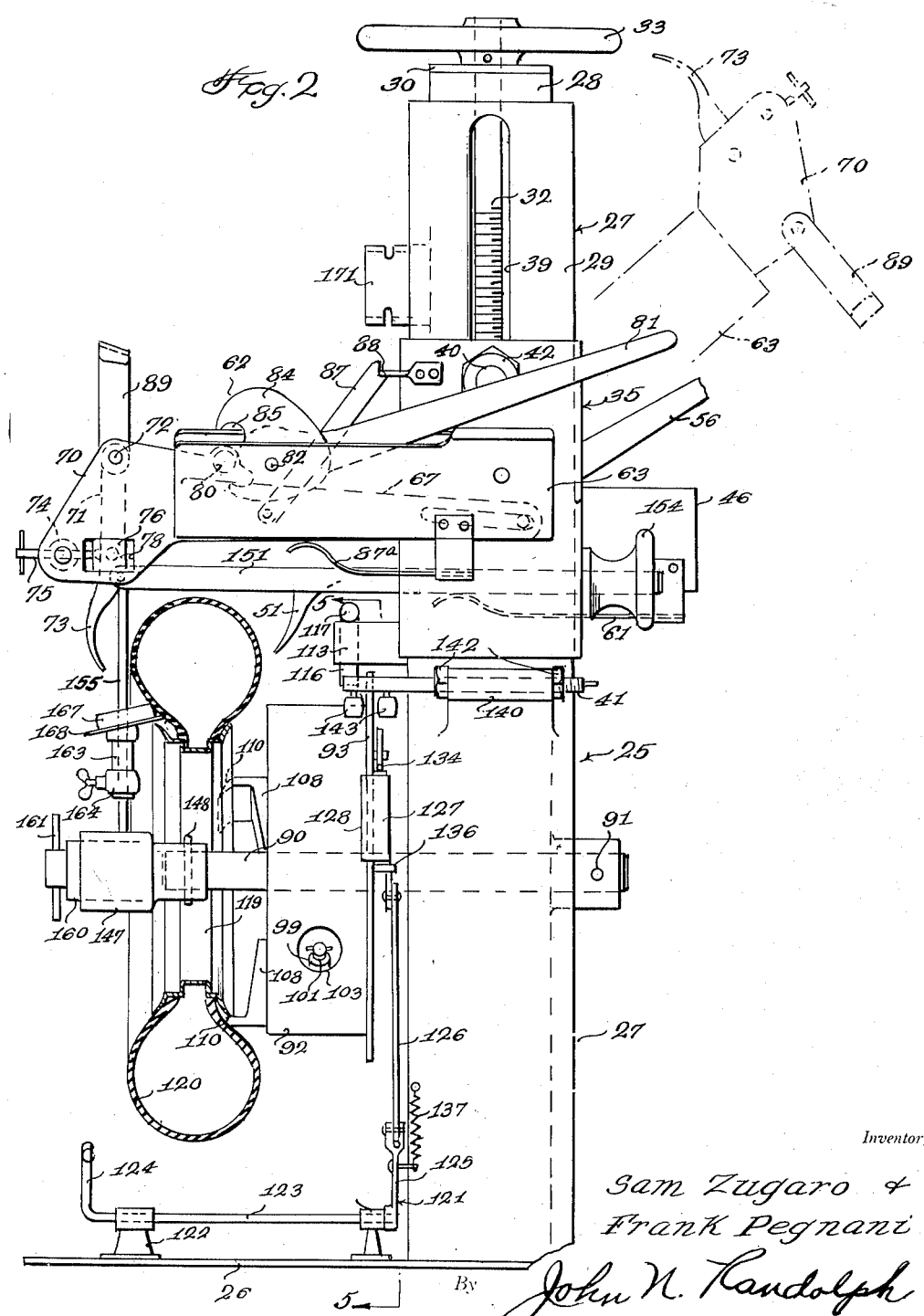

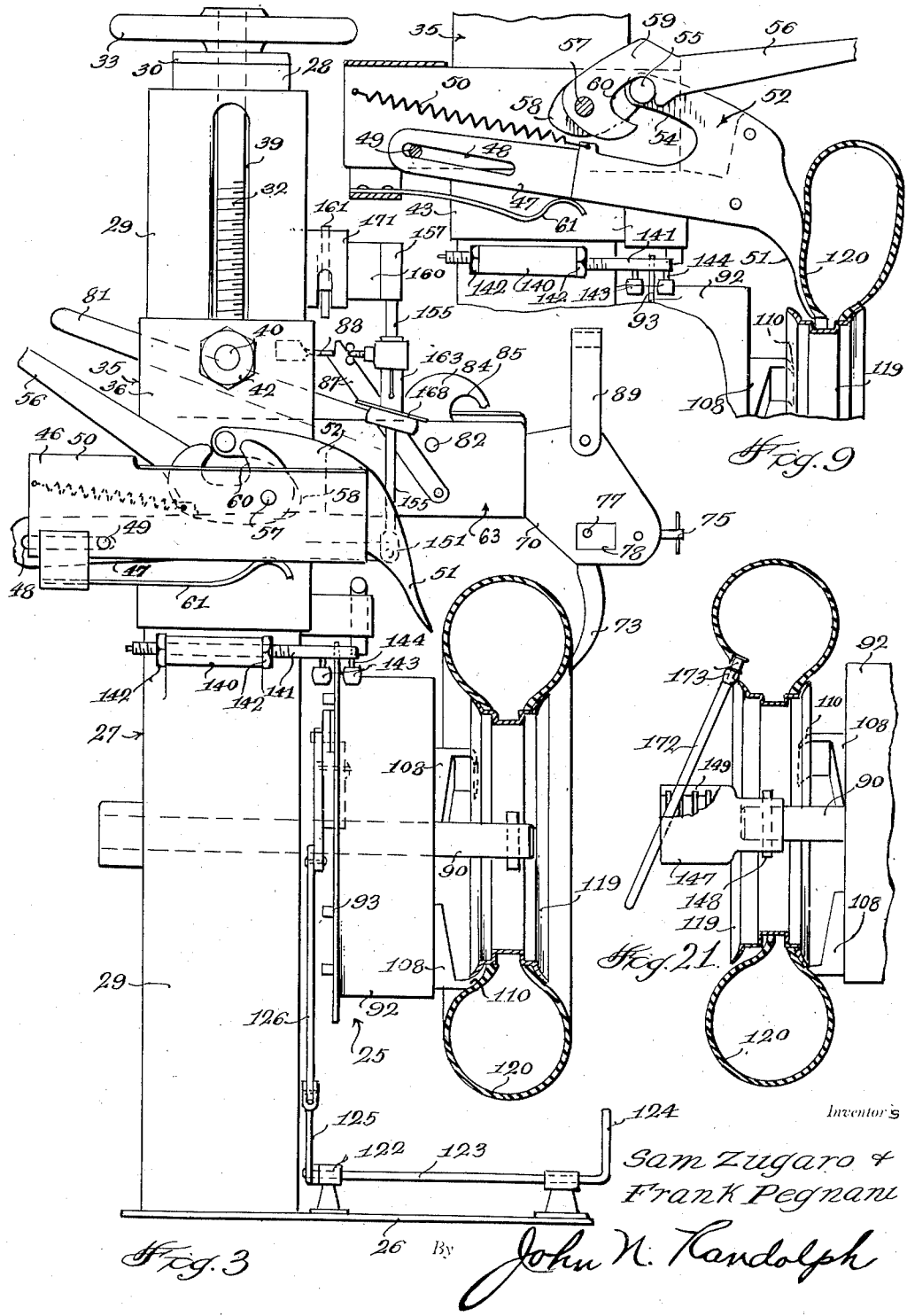

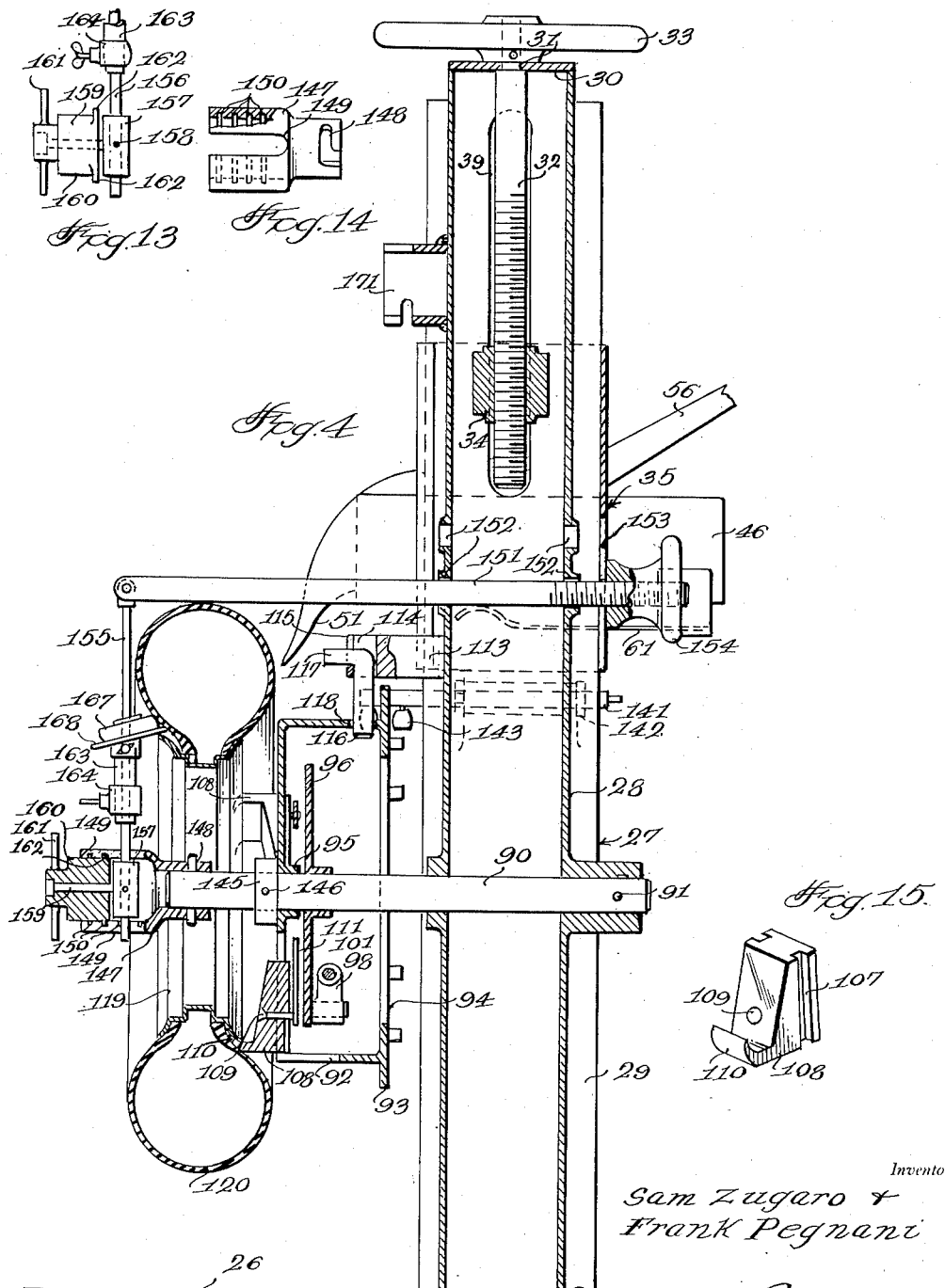

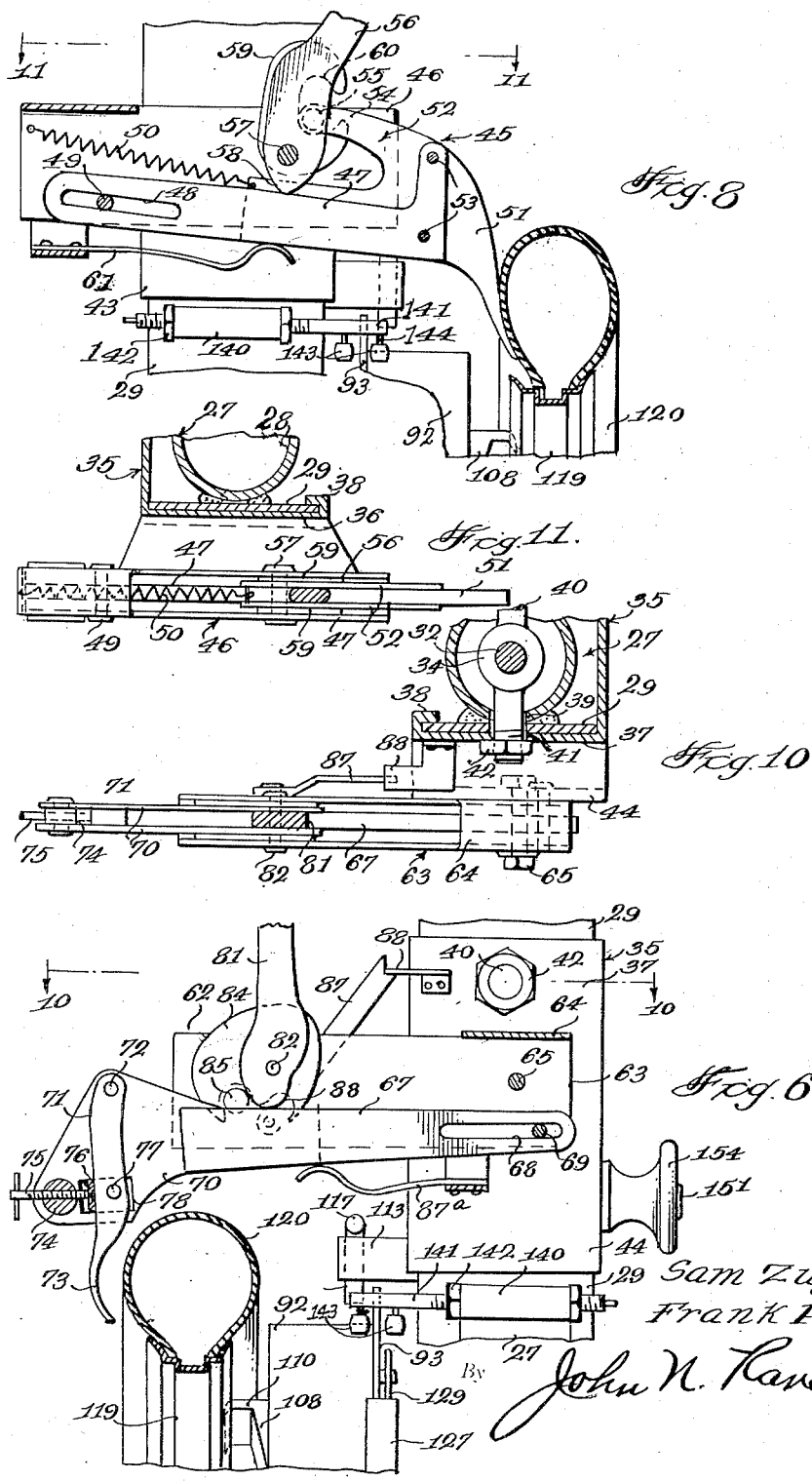

Patented Jan. 8, 1952

2,581,569

UNITED STATES PATENT OFFICE 2,581,569

TIRE REMOVING AND REPLACING MACHINE WITH A ROTATABLE WHEEL SUPPORT

Sam Zugaro and Frank Pegnani, Powhatan Point, Ohio

Application August 13, 1948, Serial No. 44,066

7 Claims. (Cl. 157—1.24)

This invention relates to a novel machine capable of being employed without the use of other tools for removing a pneumatic tire from its rim or for replacing the tire on the rim.

More particularly, it is an object of the present invention to provide a novel machine through the use of which an operator may quickly and easily break a tire loose from its rim under conditions where it has become vulcanized thereto and without injury to the tire or rim, thereafter remove one beading of the tire from the rim to permit ready removal of a tube for inspection, repair or replacement, revolve the rim and tire so that the interior of the tire can be carefully inspected, replace the tube and by a simple operation of the machine re-apply the removed bead of the tire to the rim, all with a minimum of manual effort and at a great saving in time.

Still another object of the invention is to provide a machine which may be employed for simultaneously breaking loose both side walls of a tire from the rim and equipped with means for revolving the tire and rim by step-by-step movement for breaking the tire loose from the rim at all points about its circumference.

A further object of the invention is to provide a novel holding and supporting means which is manually adjustable for clamping engagement with one side of the rim for supporting the rim and tire on the machine and which is capable of being either freely rotated or locked against rotation.

Still another object of the invention is to provide a machine having adjustable parts for accommodating wheels, rims and tires of different sizes.

Still another object of the invention is to provide a machine having novel tire wall engaging units constructed and arranged for initial movement downwardly into a rim between a side flange of the rim and an adjacent side wall of a tire mounted thereon and for subsequent movement away from said rim flange for breaking said side wall and its bead away from the rim.

Various other objects and advantages of the invention will hereinafter become more fully apparent from the following description of the drawings, illustrating a preferred embodiment thereof, and wherein:

Figure 1 is a front elevational view showing the machine in an operative position and with a rim and tire applied thereto;

Figure 2 is a side elevational view, partly in vertical section, looking from right to left of Figure 1;

Figure 3 is a view similar to Figure 2 but looking from left to right of Figure 1;

Figure 4 is a vertical sectional view taken substantially along a plane as indicated by the line 4—4 of Figure 1;

Figure 5 is a vertical sectional view taken substantially along a plane as indicated by the line 5—5 of Figure 2;

Figure 6 is an enlarged sectional view taken substantially along a plane as indicated by the line 6—6 of Figure 1;

Figure 7 is a view similar to Figure 6 but showing the tire engaging unit engaged with the outer side wall of the tire;

Figure 8 is a sectional view taken substantially along a plane as indicated by the line 8—8 of Figure 1;

Figure 9 is a view similar to Figure 8 but showing the parts thereof in a projected position and in engagement with the inner side wall of the tire;

Figure 10 is a sectional view taken substantially along a plane as indicated by the line 10—10 of Figure 6;

Figure 11 is a sectional view taken substantially along a plane as indicated by the line 11—11 of Figure 8;

Figure 12 is a sectional view, partly in plan taken substantially along a plane as indicated by the line 12—12 of Figure 1;

Figure 13 is a fragmentary side elevational view of one element of the machine;

Figure 14 is a side elevational view, partly in section of another element thereof;

Figure 15 is a perspective view of one of the rim engaging claws;

Figure 16 is a perspective view of one of the parts of the unit disclosed in Figure 7;

Figure 17 is a fragmentary perspective view of another part thereof;

Figure 18 is a side elevational view, partly in section, showing the machine being employed for applying the spring retaining ring of a truck tire rim;

Figure 19 is a fragmentary elevational view taken at a right angle to Figure 18 and showing the machine employed for removing the spring retaining ring;

Figure 20 is a sectional view taken substantially along a plane as indicated by the line 20—20 of Figure 19; and Figure 21 is a view similar to Figure 18 but showing the machine parts being employed for detaching one side wall of a tire from its rim.

Referring more specifically to the drawings, the tire removing and replacing machine in its entirety and constituting the invention, is designated generally 25 and includes a base 26 adapted to rest upon any suitable supporting surface and provided with an upright post or standard, designated generally 27 and composed of a hollow, central and preferably tubular portion 28 and two oppositely disposed side members 29 which are secured in any suitable manner as by welding to opposite sides of the tube 28 and each of which is of a width greater than the diameter of the tube 28, as best illustrated in Figure 4.

The tube 28 is provided at its upper end with a plate or head 30 having a central opening 31 through which extends the restricted shank portion of a feed screw 32 which is journalled in said opening 31. The upper end of the shank portion of the feed screw 32 and which is disposed above the head 30 has a hand wheel 33 secured thereto. A nut or follower member 34 threadedly engages the feed screw 32 and is disposed for longitudinal movement in the tube 28.

A carrier 35 of U-shaped cross section engages around the back and two sides of the post 27 and the two legs 36 and 37 of said carrier, as seen in Figures 11 and 10, respectively, which engage the sides of the post 27 or over the plates 29 thereof are provided with turned back free end portions 38 which engage around the forward edges of the plates 29 for slidably mounting the carrier 35 on the post 27. The post 27 is provided with oppositely disposed elongated openings 39 formed in the tube 28 and plates 29 for slidably receiving threaded arms 40 which project radially in opposite directions from the nut or follower 34, as best seen in Figures 1 and 11 and which extend loosely and slidably through the openings 39 and through the openings 41 of the side portions 36 and 37 of the carrier 35. A nut 42 engages each shank 40 externally of the carrier 35 for supporting said carrier on the follower or nut 34, and it will be readily apparent that the carrier will be moved longitudinally of the post 27 when the feed screw 32 is revolved by its hand wheel 33.

The side portions 36 and 37 of the carrier 35 are provided with upwardly and outwardly projecting flange portions 43 and 44, respectively, the former of which is disposed substantially below the level of the latter, as best illustrated in Figure 1 and for a purpose which will hereinafter become apparent. The surface of flange 43, as best seen in Figures 8 and 11, provides a support for an inner side wall engaging unit, designated generally 45 including an elongated housing 46 which is fixedly secured to said surface 43 and on the outer side thereof and in which a bar 47 is slidably mounted for lengthwise movement and provided with an elongated opening 48 for loosely engaging a pin 49 anchored in the housing 46 and which extends through said opening 48 to limit the sliding movement of the bar 46 and upon which said bar is swingably mounted. A contractile spring 50 is connected to the bar 47 and housing 46 for normally urging said bar rearwardly or from right to left of Figure 8. The bar 47 is provided with enlarged forwardly and downwardly curved forward end 51 which tapers at its extremity to a point and which is adapted to engage the inner side wall of a tire, as illustrated in Figure 8. A pair of corresponding plates or flanges 52 are disposed within the housing 46 and secured one on either side of the bar 47 by fastenings 53. The plates 52 have upper rearwardly extending portions forming arms 54 each having at its terminal an outwardly projecting trunnion 55. A lever 56 which extends upwardly through the open top portion of the housing 46 has a lower end disposed within said housing 46 and between portions of the plates 52 including the terminals of the arms 54 and which is swingably supported on a pivot pin or bolt 57 which extends therethrough and through the sides of the housing 46 and between portions of the plates 52. The lever 56 is provided with a tapered lower end 58 forming a cam element for engaging the upper edge of the bar 47 and said lever is provided above and adjacent said end 58 with a pair of corresponding plates 59 which are secured one on either side thereof and which straddle portions of the arms 54. The plates 59 are provided with notches 60 to accommodate the trunnions 55 and which are of a shape to cause the bar 47 to be projected forwardly against the action of the spring 50 as the lever 56 is swung forwardly from a rearmost position in a clockwise direction as seen in Figure 8. As the lever 56 approaches an upright position its portion 58 engages the bar 47 for swinging said bar downwardly in a clockwise direction on the pin 49 as a pivot and the trunnions 55 thereafter by engaging the intermediate or bed portions of the notches 60 again project the bar 57 forwardly or from left to right of Figure 8, as the lever 56 is swung beyond its position of Figure 8. A leaf spring 61, carried by the housing 46 and engaging the bottom edge of the bar 47 tends to urge the end 51 of the bar upwardly on the pivot 49. As the lever 56 completes its clockwise, downward swinging movement the bed portions of the notches 60 by engagement with the trunnions 55 urge the bar portion 51 downwardly and forwardly, for a purpose which will hereinafter become apparent.

An outer tire wall engaging unit, designated generally 62 is supported on the flange or surface 44 of the carrier 35 and includes a housing 63 formed of side walls and an upper rear connecting portion 64 which is pivotally supported by a bolt 65 which extends through the flange 44 and through the side walls of the housing 63. A bar 67 is disposed for longitudinal sliding movement in the housing 63 and is provided with an elongated opening 68 for loosely receiving a pin 69 which extends transversely through the housing 63 for swingably and slidably supporting said bar 67 therein. The bar 67 at its forward end is provided with forwardly extending side plates 70 between the upper portions of which a tire engaging arm 71 is pivotally mounted at its upper end on a pin 72 which extends therethrough and through the plates 70. The lower hook-like end 73 of the arm 71 is adapted to engage the outer side wall of a tire and depends below the plates 70. A bushing member 74 is swively mounted between the outer end portions of the plates 70 and has a diametrical threaded bore to receive a feed screw 75 the inner end of which is swively connected to the intermediate portion of a yoke 76 which straddles and is pivotally connected to the intermediate portion of the arms 72 by a pivot pin 77. The side portions of the yoke 76 engage opening 78 in the plates 70 and it will be readily apparent that the hook portion 73 may be adjusted outwardly or inwardly with respect to the plates 70 by turning the feed screw 75 in opposite directions.

The inner ends of the plates 70 which straddle the forward end of the bar 67 are provided with upstanding ears 79 which extend above the upper edge of the bar 67 and each of which is provided with an outwardly projecting trunnion 80. A lever 81 is pivoted adjacent its lower end on a pin 82 in the housing 63 and extends upwardly therefrom and is provided therebeneath with a rounded cam portion 83 adapted to bear upon the upper edge of the bar 67 when the lever 81 is in substantially an upright position, as seen in Figure 6. A pair of plates 84 are secured one on either side of the lower end of the lever 81 and said plates are each provided with a notched edge portion forming a recess or notch 85 having claw portions at the ends thereof and an intermediate projection 86 which substantially divides said notch into corresponding smaller notches. A spring 87a, similar to the spring 61, is supported at one end thereof by the housing 63 and has its free end bearing against the underside of the bar 67 for urging the forward end of said bar and the parts supported thereby to swing upwardly on the pin 69 as a pivot and toward the lever 81. Details of the bar 67, plates 70 and parts carried thereby, lever 81 and plates 84, are illustrated in Figures 16 and 17.

The housing 63 is adapted to be swung downwardly and forwardly from an inoperative position to an operative position as illustrated in Figures 6 and 10 and said housing 63 carries a pivotally mounted brace 87 having a notched free end for engagement detachably with a flange or bracket 88 which is fixedly supported on the carrier 35, as best illustrated in Figure 6, for releasably retaining the housing 63 and the tire engaging unit 62 in an operative position. When the lever 81 is initially swung in a counterclockwise direction from a rearmost position on the pivot 82, the lever portion 83 initially engages the upper edge of the bar 67 to swing said bar downwardly on the pin 69 as a pivot and against the action of the spring 87a. As the lever 81 approaches its upright position of Figure 6, the trunnions 80 engage in the forward recesses of the notches 85 so that as the lever 81 is swung beyond its position of Figure 6 and the portion 83 thereof moves out of contact with the bar 67, the bed of the forward portion of the notches 85 by engagement with the trunnions 80 will continue to urge the bar 67 downwardly and the forward ends of said notches in swinging downwardly and rearwardly and by being in engagement with the trunnions 80 will thereafter move the bar 67 downwardly and rearwardly so that the hook portion 73 will be initially moved into engagement with the outer wall of the tire, as illustrated in Figure 6, and thereafter displaced downwardly so that its pointed free end will engage between the outer wall of the tire and the tire rim and the final rearward movement of the bar 67 will move the free end of the hook 73 inwardly of the rim and away from its outer flange. As this position is reached, the lever 81 will be extending forwardly from the pivot 82, and the unit 62 carries a latch bar 89, as seen in Figure 2, which is swingably supported on the pivot 72 and which has a hook-shaped upper end for engagement over the lever 81 for retaining the parts of the outer tire wall engaging unit 62 in a fully applied position and as best illustrated in Figure 7.

The plates 59 of the lever 56 and the plates 84 of the lever 81 are suitably spaced from said levers by any suitable means such as connecting welds, not shown, and so that said plates can straddle portions of the plates 52 and 70, respectively.

Referring particularly to Figures 1, 2, 4, 5 and 12, the tube 28 near the lower end of the post 27 is provided with aligned bosses the axes of which are disposed parallel to the sides 29 for receiving one end of an axle 90 which is fixed to one of the bosses by a pin 91. The other end of the axle 90 extends forwardly from the post 27 for journalling a drum 92 thereon in front of the post 27. The drum 92 is provided with a flange 93 on its inner or rear end which projects outwardly from the periphery thereof and inwardly with respect thereto to define a relatively large opening 94 at the inner side of said drum and the outer wall thereof is provided with a central bushing 95 for engagement with the axle 90 and by which the drum 92 is rotatably supported on said axle. A disk 96 is centrally journalled on the axle 90 within the drum 92 and has a rearwardly projecting pin 97 disposed adjacent a portion of the periphery thereof for pivotally supporting an elongated threaded socket member 98, as best illustrated in Figure 5. A bushing 99 is pivotally supported by an ear 100 on the front wall of the drum 92 outwardly of the periphery of the disk 96, for rotatably engaging the unthreaded portion of a feed screw 101 which extends therethrough and which is held against reciprocal movement by collars 102 which are detachably secured to the feed screw 101 and which engage the ends of the bushing 99. The feed screw 101 has a threaded end which extends into the threaded recess of the socket 98 and has an opposite end which projects outwardly through an opening 103 in the periphery of the drum 92 and which is provided with pins for engagement with slots of the socket end 104 of a crank 105 to form a detachable bayonet joint connection between said crank and the feed screw 101 and by means of which, through rotation of the crank 105, the disk 96 will be revolved relatively to the drum 92.

As seen in Figure 4, the front wall of the drum 92 is provided with circumferentially spaced radially extending elongated openings 106 each of which is adapted to be slidably engaged by the groove 107 of a hook 108 which is formed of detachably connected sections, connected by a fastening 109, as best seen in Figure 15. Accordingly, it will be readily apparent that the hooks 108 are disposed for radial sliding movement in the openings 106 and relatively to the drum 92 and the hook portions 110 thereof are disposed at the outer ends of said hooks 108 and project outwardly from the drum 92. Each of the fastenings 109 has an inner protruding end which is pivotally connected to the outer end of a link 111. As best seen in dotted lines of Figure 5, the opposite ends of the links 111 are eccentrically and pivotally connected to the disk 96 by pins 112 so that when the disk 96 is turned in one direction by rotation of the feed screw 101, the links 111 will project the hooks 108 radially outwardly of the drum 92 or when said feed screw is revolved in the opposite direction, the hooks 108 will be drawn inwardly of the drum 92 by the links 111.

A supporting bracket 113, as best seen in Figure 4, projects outwardly from the post 27 above the drum 92 and is provided adjacent its outer end with a perpendicular opening 114 which communicates with an outwardly opening notch 115 in said bracket 113. A pin 116 extends reciprocally through the opening 114 and the upper end thereof is turned outwardly to form a handle 117 which engages in the notch 115 when the pin is in a projected position and with its inner end engaging in an opening 118 in the periphery of the drum 92 to retain said drum against rotation on the axle 90. When the drum 92 is thus held against rotation on the axle 90, one of the hooks 108 is disposed at a bottom-most position with respect to the drum 92 so that a portion of one flange of a wheel or rim 119, carrying a pneumatic tire 120 can be engaged over the hook portion 110 of said hook 108. With the other hooks 108 in extended positions, said inner flange of the rim 119 can then be positioned so that when the crank 105 is turned in a direction for retracting the hooks 108, the other hook portions 110 will engage the inner side of other portions of said rim flange and between said flange and the adjacent side wall of the tire 120. When the tire and rim or wheel has thus been detachably clamped on the drum 92 by the hooks 108, the crank 105 is removed and the pin 116 can then be lifted by the handle 117 to disengage said pin from the opening 118 so that the drum 92 can be revolved on the axle 90 with the tire and wheel or rim. By turning the pin 116 to move the handle 117 out of alignment with the notch 115, the pin 116 will be supported in an elevated position so as not to interfere with rotation of the drum 92.

The drum 92 may be manually revolved or may be rotated by a foot pedal mechanism, designated generally 121.

As best seen in Figure 2, the foot pedal mechanism 121 includes a pair of bearings 122 which rise from the base 26 to journal a shaft 123 having an angularly disposed end, as best seen in Figure 5, forming a foot pedal 124 which normally extends upwardly from the shaft 23 at an angle with respect to the base 26. A crank 125 is keyed at one end thereof to the opposite end of the shaft 123 and projects upwardly therefrom at an angle and is pivotally connected at its opposite end to one end of a rigid link 126. As best seen in Figure 5, a lever 127 is swingably supported adjacent one end thereof on the axle 90 behind the drum 92 and is pivotally connected intermediate of its ends to the upper end of the link 126 and as seen in Figure 12 has a turned back portion 128 which cooperates with an adjacent portion of the lever 127 for straddling the flange 93. A pawl 129 is pivotally supported on a pivot pin 130 which extends from the lever 127 toward its turned back portion 128 and is provided with a recessed underside forming a hook 131 adjacent its inner free end which is adapted to engage over circumferentially spaced pins or studs 132 which project inwardly or rearwardly from the flange 93. The hook shaped end 131 of the pawl 129 is urged in a direction for engagement with the studs 132 by a contractile coiled spring 133 which extends from said end and which is anchored to the lever 127 adjacent its pivot on the axle 90. A shaft 134 is journalled in the outer end of the lever 127 and has a laterally projecting handle 135 at its upper end and an eccentric cam member 136 at its lower end and which bears against the opposite, outer end of the pawl 129 so that by turning said shaft 134 and cam member 136, the pawl 129 can be rocked on its pivot and against the action of the spring 133 for displacing its hook-shaped end 131 outwardly and so that said end will clear the studs 132 to permit the drum 92 to be revolved manually without interference by the pawl 129 and when said cam member 136 is turned through an arc of 180° from its position of Figure 5. As seen in Figure 1, a contractile coiled spring 137 extends from the post 27 and connects with the crank 125 for urging the crank and pedal 124 upwardly for thereby causing the lever 127 to be swung upwardly and so that the hook-shaped end 131 of the pawl 129 will be advanced upwardly to engage a stud 132 when the cam 136 is in an outer, inoperative position as seen in Figure 5. A stop 138 projects from the crank 125 to engage a flange 139, forming a connection between the base 26 and post 27, for limiting said upward movement of the link 126 and lever 127 in response to the spring 137. It will thus be readily apparent that the foot pedal 124 can be depressed for revolving the drum 92, rim 119 and tire 120 in a clockwise direction as seen in Figure 1 and upon releasing the pressure from the foot pedal 124 the spring 137 will cause the parts to swing upwardly and the spring 133 will cause the hook 131 to engage the next stud 132 disposed above the stud previously engaged and so that the next time that the foot pedal 124 is depressed the parts 92, 119 and 120 will again be turned clockwise as seen in Figure 1, to thereby provide a foot actuated means for turning the rim and tire in one direction in a step-by-step movement.

As best illustrated in Figures 2, 3, 6 and 7, each plate 29 is provided on its outer side and below the lowermost position of movement of the carrier 35 with a transversely extending sleeve 140 for receiving a rod 141 having a threaded end extending loosely through said sleeve and provided with jam nuts 142 for bearing against each end of the sleeve 140 for adjustably positioning the rod 141 relatively thereto. The forward end of the rod 141 is provided with a pair of longitudinally spaced laterally projecting rollers 143 which are mounted on stub shafts 144 projecting from the rod 141. The rollers of each pair of rollers 143 straddle the outer portion of the flange 93 to restrict the sliding movement of the drum 92 on the axle 90. Additionally, and as illustrated best in Figure 4, a collar 145 is adjustably secured on the axle 90 by a setscrew 146 and bears against the outer side of the drum 92 to limit the outward movement of said drum on the axle.

A socket member 147 has a restricted end which is detachably mounted on the outer, forward end of the axle 90 by a bayonet joint 148. The enlarged outer portion of said socket member 147, which projects forwardly from the axle 90, is provided with upper and lower longitudinally extending outwardly opening slots 149 which are disposed in vertical alignment and the interior of said enlarged portion is provided with longitudinally spaced grooves 150. A rod 151 extends through aligned opening 152 of the tube 28 and through a downwardly opening longitudinally extending slot 153 of the intermediate portion of the carrier 35 and has a rear threaded end engaged by a nut 154 for adjustably positioning the forward end of the rod 151 which extends outwardly over the tire 120 and to which a rod 155 is swingably connected for swinging movement in a vertical plane toward and away from the outer side of the rim and tire, as best illustrated in Figure 4. As best illustrated in Figure 13, a sleeve 157 is connected to the rod 156 adjacent its lower end by a pin or fastening 158 and has a rod 159 projecting laterally therefrom and upon which a collar 160 and a turning handle 161 are turnably mounted for swivel movement relatively to the sleeve 157. The collar 160 is provided with circumferentially aligned lugs 162 which are disposed in diametrically opposed relationship for insertion in the slots 149, as illustrated in Figure 4 and so that said sleeve 157 will be disposed in the socket 147 and with the rod 155 extending through the slots 149. By then revolving the collar 160 approximately a quarter of a turn, the lugs 162 will be engaged with one of the grooves 150 for retaining the rod 155 against swinging movement and in substantially a vertical plane, as illustrated in Figure 4. For use of the machine with larger tires and rims, the rod 151 can be displaced upwardly and disposed in an upper set of openings 152, as illustrated in Figure 4.

Referring particularly to Figure 20, a sleeve 163 is slidably and turnably disposed on the rod 155 and has a slotted lower end engaged by a collar 164 carrying a setscrew 165 which is disposed radially thereof and adapted to be tightened for clamping the split end of the sleeve 163 to the rod 155 to prevent said sleeve from sliding or turning thereon. The upper end of the sleeve 163 is thickened on one side and reduced on the other to form a canted portion 166 on which is rotatably mounted a roller 167 and an annular flange 168 which is disposed thereneath and provided with a collar portion carrying a setscrew 169 so that the flange 168 may be rotatably or nonrotatably disposed on the sleeve portion 166 whereas the roller 167 is mounted at all times for rotation upon the sleeve portion 166. The ends of the portion 166 are provided with enlargements 170 to retain the parts 167 and 168 against sliding movement on the portion 166. It will accordingly be apparent that the sleeve 163 may be turned for camming the roller and flange at various angles with respect to the rim 119 and tire 120. As seen in Figures 1 and 2, the upper portion of the post 27 carries a slotted socket 171 in which the handle 161 may be detachably engaged for supporting the rod 155 in a raised, inoperative position, as illustrated in Figure 3.

From the preceding detailed description of the unit embodying the machine 25, it will be readily apparent how the tire and rim may be detachably supported by the hooks 108 on the drum 92 for rotation either by manually turning the drum 92 or by utilizing the foot pedal 124, as previously described. The tire and rim or wheel is initially applied to the drum 92 for breaking the bead of the side walls of the tire away from the rim flanges and which is accomplished by initially adjusting the carrier 35 by turning the hand wheel 33 to position the side wall engaging units 45 and 62 at proper levels for engaging the tire and rim and the plates 29 of the post 27 may be suitably graduated for indicating the proper position of the carrier 35 for tires and rims of different sizes. When the carrier 35 is properly positioned the units 45 and 62 will each be at the proper level for engagement correctly with the tire and rim and by swinging the lever 56 in a forward direction, as previously described, the rim and tire engaging element 51 of the unit 45 will be displaced downwardly so that its pointed end will engage between the inner flange of the rim 119 and the adjacent side wall of the tire 120 and further forward swinging movement of the lever 56 will displace the member 51 forwardly for breaking a portion of the inner side wall of the tire away from the inner rim flange. At the same time, the lever 81 of the unit 62 is operated to cause the hook portion 73 to engage between the outer side wall of the tire 120 and the outer rim flange and by swinging said lever 81 forwardly, said hook portion will initially move into position between the flange and side wall and thereafter move rearwardly for breaking a portion of the side wall away from the rim flange. As seen in Figure 1, the inclined portions 43 and 44 of the carrier 35 cant the units 45 and 62 so that they are disposed radially of the portions of the rim and tire engaged thereby and it will be apparent that the levers 56 and 81 can be operated simultaneously for breaking circumferentially spaced inner and outer portions of the tire away from the rim. Said units are then returned to retracted positions, as illustrated in Figure 3 after which the rim and tire with the drum 92 are revolved a portion of a turn either by operation of the foot pedal 124 or manually and the operations previously described repeated. This operation is continued until the tire beads have been completely broken away from the rim 119.

A tire removing tool, as illustrated in Figure 21 and designated generally 172 is then utilized to detach the outer wall of the tire 120 from the rim 119. The tool 172 comprises an elongated rod having separate rollers or sleeves 173 rotatably mounted on one end thereof. Said end is inserted between the outer rim flange and adjacent tire wall and with the rod 155 disposed as seen in Figure 21, the tool 172 is swung downwardly so that its handle portion is positioned in the slots 149 of the socket 147 and with one of the rollers 173 bearing on the outer rim flange and another roller bearing on the tire bead. The drum 92 is then revolved for revolving the rim and tire and upon completion of one revolution thereof the outer side wall of the tire will be disengaged from the rim flange so that the inner tube, not shown, can be removed from the tire, repaired and replaced. The tool 172 can also be utilized for holding the outer side wall of the tire away from the rim so that the parts can be revolved for inspection of the interior of the tire. After replacement of the inner tube, the rod 155 is positioned as seen in Figure 4 and the sleeve 163 is clamped so that the flange 168 will engage upon the outer flange of the rim and be canted as illustrated in Figures 2 and 4. With the rim 160 held non-rotatably and roller 167 disposed for rotation on the portion 166, the tire and rim are then revolved and the outer side wall of the tire will be displaced inwardly by the roller 167 and rim 168 so that upon completion of one revolution of the parts said side wall will be re-applied to the rim. The rod 155 is then swung to its inoperative position of Figure 3 after which the hooks 108 are displaced outwardly to release the rim 119 so that the rim and tire can be removed from the machine 25.

The machine 25 is also equally well adapted for applying and removing truck tires as illustrated in Figures 18, 19 and 20 and wherein the tire 174 is mounted on a rim 175 having a fixed inner flange and a removable outer flange 176 retained in a conventional manner by a split spring ring 177 which seats in a groove 178 of the rim. To remove the tire 174, the unit 62 is initially utilized for causing the hook 73 thereof to engage and displace the flange 176 inwardly. The hook 73 is held in this position by engaging the lever 81 with the retaining hook 89 while the rod 155 is adjustably positioned for engaging the flange 168 with the rim flange 176, as illustrated in Figure 20. An end of the spring retaining ring 177 can then be detached from the groove 178, as illustrated in Figure 19 and manually held. The hook 73 is released from the flange 176 and the tire and rim are then revolved by revolving the drum 92 and as the end of the split ring 177 is being held, upon completion of one revolution of the tire and rim, the retaining ring 177 will have been detached. The hook 73 is then re-engaged to permit the flange 168 to be released from the rim flange 176 after which the hook 73 is again released so that the rim flange 176 will slide off of the rim 175 releasing the outer side wall of the tire. After the tube has been removed, repaired and replaced, the operation previously described is repeated except that an end of the retaining ring 177 is applied to the groove 178 and by then revolving the rim and tire and with the flange 176 held in an inwardly displaced position by the revolving flange 168, the retaining ring 177 will be replaced in the groove 178 as the rim 175 is revolved.

Various modifications and changes are contemplated and may obviously be resorted to, without departing from the spirit or scope of the invention as hereinafter defined by the appended claims.

We claim as our invention:

1. A tire changing machine comprising a base, a post rising from said base, an axle supported by and extending transversely through said post, a drum rotatably mounted on said axle and disposed above said base and forwardly of the post, adjustable means carried by said drum for detachably engaging a tire rim for supporting the rim and a tire carried thereby in front of said drum and for rotation therewith, a carrier mounted for sliding movement lengthwise of the post, feed screw means for moving the carrier on the post, an inner tire wall engaging unit mounted on one side of said carrier including a slidably mounted tire engaging element, cam and lever actuating means for displacing said tire wall engaging element downwardly and outwardly or forwardly for positioning a portion thereof between the inner side wall of the tire and inner flange of the rim and for displacing said tire wall away from the rim flange; an outer tire wall engaging unit mounted on the opposite side of said carrier and including a slidably and swingably supported tire wall engaging hook, lever and cam means forming a part of said outer tire wall engaging unit and operable for manually displacing said hook downwardly and rearwardly or inwardly for engagement between the opposite, outer flange of the rim and the outer side wall of the tire and for displacing said outer tire wall away from said outer flange, a foot pedal swingably supported on said base, a lever swingably supported on the axle, a pawl pivotally mounted on said lever, circumferentially spaced studs projecting from one side of said drum for selective engagement by said pawl, and link means connecting said foot pedal and lever for swinging the lever relatively to the axle when the foot pedal is depressed to cause the drum to be rotated by engagement of the pawl with one of said studs.

2. A tire changing machine comprising a base, a post rising from said base, an axle supported by and extending transversely through said post, a drum rotatably mounted on said axle and disposed above said base and forwardly of the post, adjustable means carried by said drum for detachably engaging a tire rim for supporting the rim and a tire carried thereby in front of said drum and for rotation therewith, a carrier mounted for sliding movement lengthwise of the post, feed screw means for moving the carrier on the post, an inner tire wall engaging unit mounted on one side of said carrier including a slidably mounted tire engaging element, cam and lever actuating means for displacing said tire wall engaging element downwardly and outwardly or forwardly for positioning a portion thereof between the inner side wall of the tire and inner flange of the rim and for displacing said tire wall away from the rim flange; an outer tire wall engaging unit mounted on the opposite side of said carrier and including a slidably and swingably supported tire wall engaging hook, lever and cam means forming a part of said outer tire wall engaging unit and operable for manually displacing said hook downwardly and rearwardly or inwardly for engagement between the opposite, outer flange of the rim and the outer side wall of the tire and for displacing said outer tire wall away from said outer flange, a foot pedal swingably supported on said base, a lever swingably supported on the axle, a pawl pivotally mounted on said lever, circumferentially spaced studs projecting from one side of said drum for selective engagement by said pawl, and link means connecting said foot pedal and lever for swinging the lever relatively to the axle when the foot pedal is depressed to cause the drum to be rotated by engagement of the pawl with one of said studs, spring means for returning the foot pedal and lever to their initial positions for causing movement of the pawl into position for engagement with another of the studs, and cam means for displacing and retaining said pawl in an inoperative position out of engagement with the studs to permit the drum to be revolved relatively to the lever and pawl.

3. A tire changing machine, comprising a base, a post rising from said base, an axle supported by and extending transversely through said post, a drum rotatably mounted on said axle and disposed above said base and forwardly of the post, adjustable means carried by said drum for detachably engaging a tire rim for supporting the rim and a tire carried thereby in front of said drum and for rotation therewith, a carrier mounted for sliding movement lengthwise of the post, feed screw means for moving the carrier on the post, an inner tire wall engaging unit mounted on one side of said carrier including a slidably mounted tire engaging element, cam and lever actuating means for displacing said tire wall engaging element downwardly and outwardly or forwardly for positioning a portion thereof between the inner side wall of the tire and inner flange of the rim and for displacing said tire wall away from the rim flange; an outer tire wall engaging unit mounted on the opposite side of said carrier and including a slidably and swingably supported tire wall engaging hook, lever and cam means forming a part of said outer tire wall engaging unit and operable for manually displacing said hook downwardly and rearwardly or inwardly for engagement between the opposite, outer flange of the rim and the outer side wall of the tire and for displacing said outer tire wall away from said outer flange, said inner tire wall engaging unit including a bar carrying said tire wall engaging element and mounted for forward and rearward sliding movement and for pivotal movement in a direction radially of the rim and tire, spring means for urging said bar to a raised, retracted position, and said cam and lever means including a cam element for initially displacing the bar downwardly when the lever thereof is swung forwardly and additional cam elements for subsequently displacing the bar downwardly and forwardly for positioning the tire wall engaging element initially between the tire wall and rim flange and for subsequently moving said element away from said rim flange and in a direction inwardly of the rim.

4. A tire changing machine comprising a base, a post rising from said base, an axle supported by and extending transversely through said post, a drum rotatably mounted on said axle and disposed above said base and forwardly of the post, adjustable means carried by said drum for detachably engaging a tire rim for supporting the rim and a tire carried thereby in front of said drum and for rotation therewith, a carrier mounted for sliding movement lengthwise of the post, feed screw means for moving the carrier on the post, an inner tire wall engaging unit mounted on one side of said carrier including a slidably mounted tire engaging element, cam and lever actuating means for displacing said tire wall engaging element downwardly and outwardly or forwardly for positioning a portion thereof between the inner side wall of the tire and inner flange of the rim and for displacing said tire wall away from the rim flange; an outer tire wall engaging unit mounted on the opposite side of said carrier and including a slidably and swingably supported tire wall engaging hook, lever and cam means forming a part of said outer tire wall engaging unit and operable for manually displacing said hook downwardly and rearwardly or inwardly for engagement between the opposite, outer flange of the rim and the outer side wall of the tire and for displacing said outer tire wall away from said outer flange, said outer tire wall engaging unit also including a bar mounted for forward and rearward sliding movement and for swinging movement in a direction radially of the rim and tire, said tire wall engaging hook being pivotly mounted on said bar, manually actuated means for adjusting said tire wall engaging hook relatively to the bar, and said lever and cam means acting on the bar for swinging it downwardly and then rearwardly for initially engaging the hook between the outer rim flange and outer tire wall and for subsequently forcing said tire wall away from the outer rim flange.

5. A tire changing machine comprising a base, a post rising from said base, an axle supported by and extending transversely through said post, a drum rotatably mounted on said axle and disposed above said base forwardly of the post, adjustable means carried by said drum for detachably engaging a tire rim for supporting the rim and a tire carried thereby in front of the drum and for rotation therewith relatively to the axle, a foot pedal swingably supported on the base, a lever swingably connected to the axle, a pawl pivotally mounted on said lever, circumferentially spaced studs projecting from one side of said drum and disposed to be selectively engaged by the pawl, link means connecting the foot pedal and lever for swinging the lever relatively to the axle when the foot pedal is depressed to cause the drum to be rotated by engagement of the pawl with one of said studs, a socket member detachably mounted on the outer end of said axle and provided with opposite upper and lower slots opening outwardly of its outer, forward end, a rod adjustably supported on the post and extending outwardly over the tire, a second rod swingably supported on said first mentioned rod, means carried by said second rod for adjustably and detachably engaging said socket for supporting the rod in substantially an upright position outwardly of the tire and rim, a roller and flange rotatably mounted relatively to said second rod and supported thereon, means for canting said roller and flange for positioning the flange adjacent an edge of the rim for either displacing a wall of a tire inwardly and into engagement with the rim as the drum, rim and tire are revolved, or for displacing a removable rim flange inwardly of the rim to permit a split retaining spring ring of the rim to be removed therefrom or applied thereto.

6. A tire changing machine comprising a base, a post rising from said base, an axle supported by and extending transversely through said post, a drum rotatably mounted on said axle and disposed above said base forwardly of the post, adjustable means carried by said drum for detachably engaging a tire rim for supporting the rim and a tire carried thereby in front of the drum and for rotation therewith relatively to the axle, a foot pedal swingably supported on the base, a lever swingably connected to the axle, a pawl pivotally mounted on said lever, circumferentially spaced studs projecting from one side of said drum and disposed to be selectively engaged by the pawl, link means connecting the foot pedal and lever for swinging the lever relatively to the axle when the foot pedal is depressed to cause the drum to be rotated by engagement of the pawl with one of said studs, a slotted socket member detachably connected to the outer end of said axle, and a tire tool adapted to have one of its ends engaged between the outer rim flange and outer tire wall for displacing a portion of the tire wall outwardly of the rim flange when said tool is rocked on said flange as a fulcrum for positioning its opposite end in engagement with said slotted socket, said socket holding said tool while the tire and rim are revolved with the drum relatively thereto for removing said outer tire wall from the rim.

7. A tire changing machine comprising a base, a post rising from said base, an axle supported by and extending transversely through said post, a drum rotatably mounted on said axle and disposed above said base forwardly of the post, adjustable means carried by said drum for detachably engaging a tire rim for supporting the rim and a tire carried thereby in front of the drum and for rotation therewith relatively to the axle, a foot pedal swingably supported on the base, a lever swingably connected to the axle, a pawl pivotally mounted on said lever, circumferentially spaced studs projecting from one side of said drum and disposed to be selectively engaged by the pawl, link means connecting the foot pedal and lever for swinging the lever relatively to the axle when the foot pedal is depressed to cause the drum to be rotated by engagement of the pawl with one of said studs, a slotted socket member detachably connected to the outer end of said axle, and a tire tool adapted to have one of its ends engaged between the outer rim flange and outer tire wall for displacing a portion of the tire wall outwardly of the rim flange when said tool is rocked on said flange as a fulcrum for positioning its opposite end in engagement with said slotted socket, said socket holding said tool while the tire and rim are revolved with the drum relatively thereto for removing said outer tire wall from the rim, said first mentioned end of the tire tool having a plurality of separate rollers or sleeves rotatably mounted thereon for engagement with the tire wall and rim flange.

SAM ZUGARO.
FRANK PEGNANI.

REFERENCES CITED

The following references are of record in the file of this patent:

UNITED STATES PATENTS

| Number | Name | Date |
|---|---|---|
| 1,445,784 | Mayer et al. | Feb. 20, 1923 |
| 1,793,864 | Manley | Feb. 24, 1931 |
| 2,212,768 | Bonneau | Aug. 27, 1940 |
| 2,413,010 | Teegarden | Dec. 24, 1946 |